United States Patent [19]

Ewart

[11] Patent Number: 5,681,071
[45] Date of Patent: Oct. 28, 1997

[54] SELF-RELEASE CHOKER HOOK

[75] Inventor: James M. Ewart, North Vancouver, Canada

[73] Assignee: Forest Engineering Research Institute of Canada, Pointe Claire, Canada

[21] Appl. No.: 373,968

[22] Filed: Jan. 17, 1995

[30] Foreign Application Priority Data

Oct. 26, 1994 [CA] Canada .................... 2134390

[51] Int. Cl.$^6$ .................................... B66C 1/14
[52] U.S. Cl. .............................. 294/82.14; 294/75
[58] Field of Search ............ 294/82.14, 82.24, 294/74–76, 82.31, 82.33; 24/115 F, 132 R, 133; 403/316, 353

[56] References Cited

U.S. PATENT DOCUMENTS

| | | | |
|---|---|---|---|
| 1,720,069 | 7/1929 | Yeaton | 294/74 |
| 1,741,463 | 12/1929 | Hickok | 294/74 |
| 3,633,960 | 1/1972 | Drayton . | |
| 4,185,863 | 1/1980 | Larson et al. | 294/74 |
| 4,709,952 | 12/1987 | Selby . | |
| 5,064,235 | 11/1991 | Lessard . | |

FOREIGN PATENT DOCUMENTS

| | | |
|---|---|---|
| 124421 | 12/1909 | Canada . |
| 389394 | 6/1940 | Canada . |
| 510282 | 2/1955 | Canada . |
| 1018111 | 9/1977 | Canada . |
| 1225416 | 8/1987 | Canada . |
| 1241361 | 8/1988 | Canada . |
| 1247675 | 12/1988 | Canada . |

OTHER PUBLICATIONS

Article entitled "Yarding made easy", by Scott Jamieson, published in the Jul./Aug. 1993 issue of *Canadian Forest Industries*.

Article entitled "Spreading The Word", by Scott Jamieson, published in the Jul./Aug. 1993 issue of *Canadian Forest Industries*.

Article entitled "Risley Slingshot, Best of both worlds", by Scott Jamieson, published in the Jun. 1993 issue of *Canadian Forest Industries*.

Undated publication regarding "Chokers for automatic unhooking", pp. 215–222.

*Primary Examiner*—Dean Kramer
*Attorney, Agent, or Firm*—John Russell Uren

[57] ABSTRACT

A choker hook has a main body and a latch member rotatable relative to the main body. The latch member is biased by a spring thereby to form a pocket to hold the ferrule of a choker cable used in logging operations. The latch member has a toe piece which contacts the surface of a log when the choker hook is rotated by the choker cable relative to the log. The force between the toe piece and its attached latch member will tend to rotate the latch member relative to the main body when the effect of the force on the choker hook is such that the toe piece is brought into contact with the outside of the log. The ferrule pocket will open and the ferrule and attached cable will be released thereby releasing the log being transported without manual intervention at the point of log release.

21 Claims, 6 Drawing Sheets

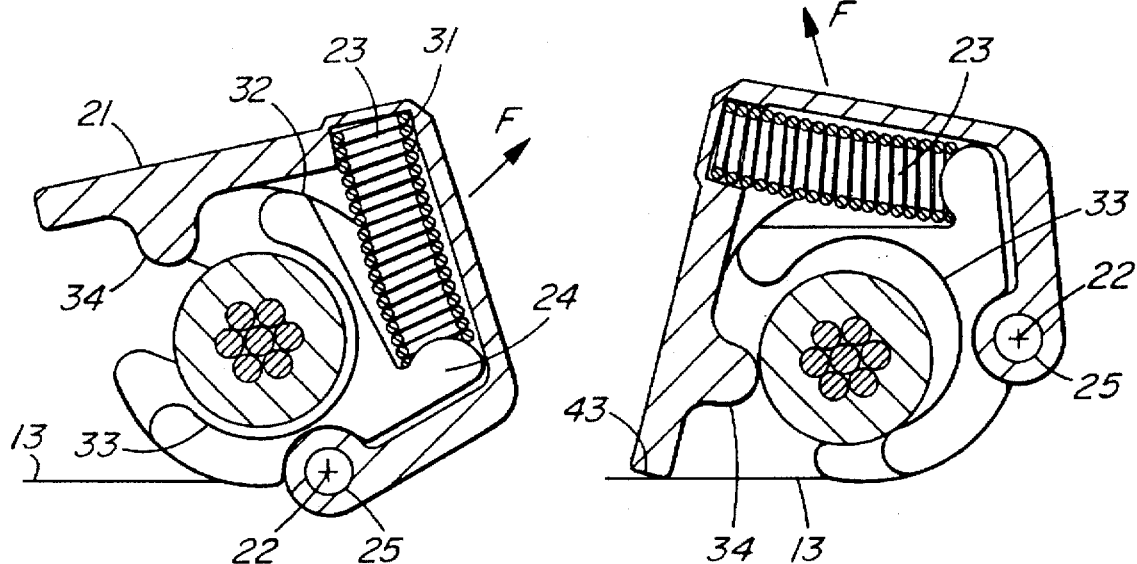
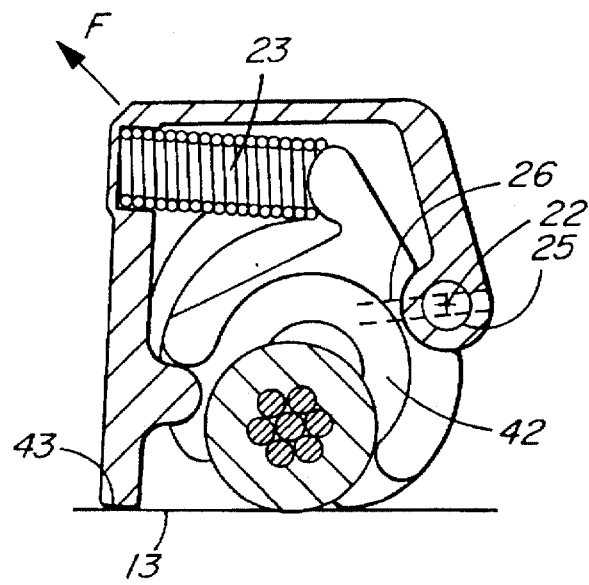
FIG. 2A  FIG. 2B
FIG. 2C 5,681,071

SELF-RELEASE CHOKER HOOK

INTRODUCTION

This invention relates to a log handling system and, more particularly, to a self-release type choker hook used with the log handling system.

BACKGROUND OF THE INVENTION

In forestry operations, felled trees are moved from their felling area to a roadside or other desired location, referred to as a landing, where they are loaded on trucks for transportation to the mill. The logs may be moved to the landing by an aerial cable system which transports the logs in a suspended or partially suspended manner using a mainline connected to a winch or yarder, the latter being used as a means of traction. A second cable or haulback returns the rigging to the felling area so that additional logs may be transported.

In one form of this cable system, the butt rigging hardware joins the ends of the mainline and the haulback. Shorter cables or chokers are suspended from the butt rigging and are placed by the chokerman in a noose-like attachment around the log or logs being transported to the landing. In so doing, the chokerman places a ferrule or knob formed on the lower end of the choker cable, into the socket of a steel choker hook which is slidably connected to the mid-section of the choker cable and which is able to slide along its entire length. As the mainline pulls the logs towards the landing, the chokers are drawn tightly around the logs.

Following the transport of the log from the felling area to the landing, the log is lowered to the ground and the ferrule is manually disengaged from the choker hook thereby releasing the log from the choker. Pulling on the haulback will reverse the cable system and return the empty chokers to the felling area for more logs.

A second technique for moving logs to a landing or roadside utilizes a tracked or rubber-tired tractor called a skidder. Chokers are, however, also used in this hauling techinque to secure the logs to the back of the skidder as the logs are transported by the pulling motion of the skidder.

In the prior art, the ferrule was required to be removed from the choker hook manually by a chaser or the skidder operator. This operation is dangerous, requires additional labour and is inefficient.

Self-release chokers have attractive features which reduce many of the deficiencies set out above. However, most of such chokers are costly and/or complex. In our U.S. application Ser. No. 08/202,573 filed Feb. 28, 1994 now U.S. Pat. No. 5,597,191, a self-release choker hook is disclosed which is intended to overcome the above problems. However, it has been found that while this choker operates well for logs of a certain size range, the self release operation for logs outside this range is not consistent.

SUMMARY OF THE INVENTION

According to the invention, there is provided a choker hook used with a choker cable used for encircling and transporting a log and having a ferrule on one end of the cable, said choker hook comprising a main body, a latch member having an outer end and being rotatable relative to said main body between closed and open positions, a ferrule pocket formed between said main body and said latch member, said latch member being operable to hold said ferrule in said ferrule pocket in said closed position and to release said ferrule from said pocket in said open position, said latch member being movable from said closed to said open position when the outer end of said latch member is forced into contact with said log circled by said choker cable.

BRIEF DESCRIPTION OF THE SEVERAL VIEWS OF THE DRAWINGS

Specific embodiments of the invention will now be described, by way of example only, with the use of drawings in which:

FIG. 2A is a cross-sectional view taken along IIA—IIA of FIG. 1 with the choker hook being illustrated in a position wherein the log is being transported from a felled area to the landing;

FIG. 2B is a cross-sectional view similar to FIG. 2A but illustrating the choker hook in a partially rotated position after the log has reached the landing and with the latch member being in initial contact with the outside of the log being transported;

FIG. 2C is a cross-sectional view similar to FIGS. 2A and 2B but illustrating the latch member in its open position such that the ferrule of the choker cable is released from the ferrule pocket of the choker hook;

DESCRIPTION OF SPECIFIC EMBODIMENT

Figure 1:
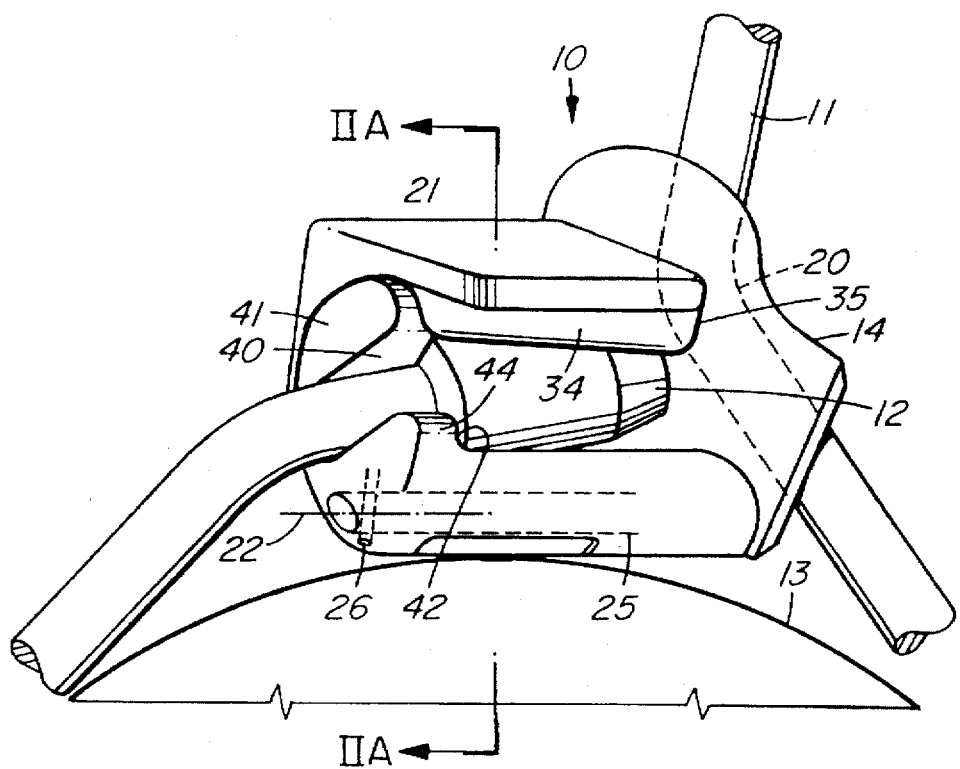
FIG. 1 is an isometric view of the choker hook according to a first embodiment of the invention illustrating the choker cable and the ferrule of the cable being held in the ferrule pocket with the latch member being in the closed position.

Reference is now made to the drawings and, in particular, to FIG. 1 wherein a choker hook according to the invention is generally illustrated at 10 and which is shown in its operating position wherein a choker cable 11 having a ferrule 12 is wrapped about and encircles a log 13, the ferrule 12 and attached cable 11 being retained by the choker hook 10.

Choker hook 10 comprises a main body 14 having a cable passageway 20 through which cable 11 is freely movable and a latch member 21 which is rotatable between open and closed positions about axis 22 and relative to main body 14. A pin 25 extends along axis 22 and serves as the hinge about which the latch member 21 rotates relative to the main body 14. A roll pin 26 maintains the pin 25 in its desired position and is removable so as to allow disassembly of the latch member 21 from main body 14.

One or more pair of compression springs 23 (only one of which is shown) are mounted between the main body 14 and the latch member 21 internally of the choker hook 10 as viewed in FIG. 2A; that is, the springs 23 are not visible from the outside of the choker hook 10 when the latch member 21 is in its closed position. The range of movement and the necessity for satisfactory spring flexing and alignment will determine whether the spring ends require a mount which will allow some degree of spring-end oscillation 24 or a simpler circular recess or pocket arrangment 31, both of which are illustrated in FIGS. 2A, 2B and 2C. The compression springs 23 act to bias the latch member 21 towards its closed position as seen in FIGS. 1, 2A and 2B. Latch member 21 is prevented from further rotation in its closed position by contact with main body 14 about a portion 32 of the outside circumference of the main body 14.

A ferrule pocket 33 is formed by the main body 14 and the latch member 21 although, as viewed in FIG. 2A, a substantial portion of the ferrule pocket 33 is defined by the inner surface of the main body 14. A keeper 34 is formed on the inner surface of the latch member 21. Keeper 34 extends along the latch member 21 in a slant or sloping configuration such that ferrule pocket 33 has an opening for receiving ferrule 12 which is larger at the end 35 (FIG. 1) of the latch member 21 remote from the outside surface 41 of the U-shaped opening 40 as will be described. Keeper 34 is adapted to positively maintain the ferrule 12 in the ferrule pocket 33 until the latch member 21 is operable to release the ferrule 12 as will also be described.

The U-shaped opening 40 is formed in the main body 14 and allows the insertion and removal of cable 11 when the ferrule 12 is inserted and released from the ferrule pocket 33.

The U-shaped opening 40 has an outside surface 41 and an internal surface 42 (FIG. 2C). The outside surface 41 is generally flat and in a plane which is perpendicular to the axis of rotation 22 of the latch member 21. The internal surface 42, however, while also being generally flat, slopes upwardly from the outer entrance 44 of the U-shaped opening 40; that is, the thickness of the main body 14 at the outer entrance 44 of the U-shaped opening 40 is thinner at the outer entrance 44 than internally of the U-shaped opening 40. The purpose of the sloped internal surface 42 is to enhance the movement of the ferrule 12 out of the ferrule pocket 33 when the latch member 21 moves to its open position as will be described hereafter.

OPERATION

In operation and with reference to the aerial cable system of FIG. 1, a chokerman (not shown) will manually encircle the felled log 13 with the choker cable 11 which is attached to a mainline (not shown). The choker hook 10 is freely slidable on choker cable 11 and the choker hook 10 will be positioned on the log 13 such that the ferrule 12 on the end of the choker cable 11 remote from the main line is insertable into the ferrule pocket 33 under the keeper 34. The cable 11 will be manually pulled tight so that the ferrule 12 is adequately secured within the ferrule pocket 33 of choker hook 10. The chokerman will signal or otherwise advise the mainline operator that the log 13 is free to be transported.

The movement of log 13 will then commence and the transport force exerted on log 13 by cable 11, indicated by "F" in FIGS. 2A–2C, will move the log 13 and choker hook 10 in the directions indicated.

When the log 13 has reached the landing and been lowered to the ground, partial tension will be maintained on the choker cable 11 as the yarder pays out on the mainline and pulls in on the haulback. This will change the direction of pull on the choker cable 11 relative to the log 13. As this direction of pull, shown as force F, moves from the position shown in FIG. 2A to that shown in FIG. 2B, the choker hook 10 will rotate relative to the log 13 and the outer end 43 of the latch member 21 will contact the surface of the log 13. In this position, the cable 11 will have moved from the inner position in U-shaped opening 40 which is the position illustrated in FIGS. 1 and 2A towards the outside entrance 42 of the U-shaped opening 40.

The force "F" will continue to rotate the choker hook 10 into the position illustrated in FIG. 2C wherein the latch member 21 is forced open by its contact with log 13 and the increasing force in cable 11 to rotate the choker hook 10. Latch member 21 will rotate relative to the main body 14 about axis 22 and against the bias of compression springs 23. The cable 11 will pass out of the outside opening 43 of the main body 14 and the ferrule 12 will follow the cable 11 because the latch member 21 and keeper 34 are no longer holding the ferrule 12 within the ferrule pocket 33. Thus, the ferrule 12 will be released, the log 13 will no longer be bound by the choker cable 11 and the choker cable 11 and choker hook 10 will be returned by the haulback for attachment to another log. It will be noted that the cable 11 and ferrule 12 are released without manual operator intervention at the site of the desired transportation position for log 13.

In the skidder log hauling technique earlier described, the skidder is reversed or makes a U-turn in order to reverse direction of force on the choker cable and thereby release the choker hook.

A further embodiment of the invention is illustrated in FIGS. 3 and 4A–4C. In this embodiment, the main body 101 and latch member 102 are positioned such that the compression springs 103 are visible from the outside of the choker hook 100 and are readily replaceable by removing the pin 110 and dismantling the choker hook 100. Also, the ease of assembly of the choker hook 100 is enhanced. The latch member 102 will rotate relative to main body 101 about axis 104 which is defined by pin 110 with the compression springs 103 continuing to provide a bias to the latch member 102 which tends to close the ferrule pocket 111 (FIG. 4A) and retain the ferrule 112 of cable 113 within the ferrule pocket 111.

Figure 3:
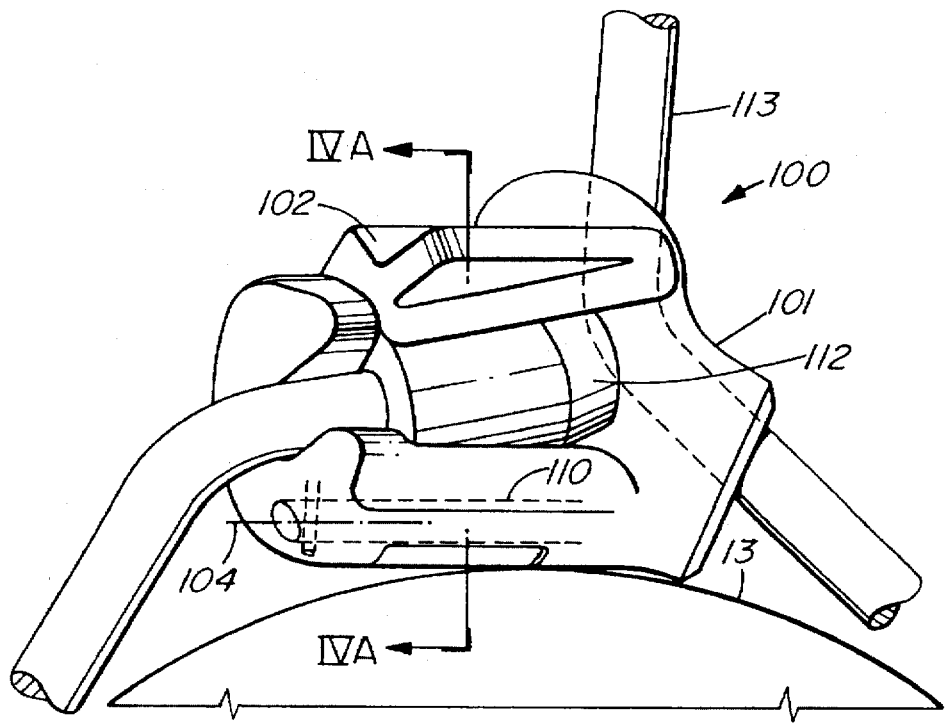
FIG. 3 is an isometric view of the choker hook according to a second embodiment of the invention.
Figure 4A:
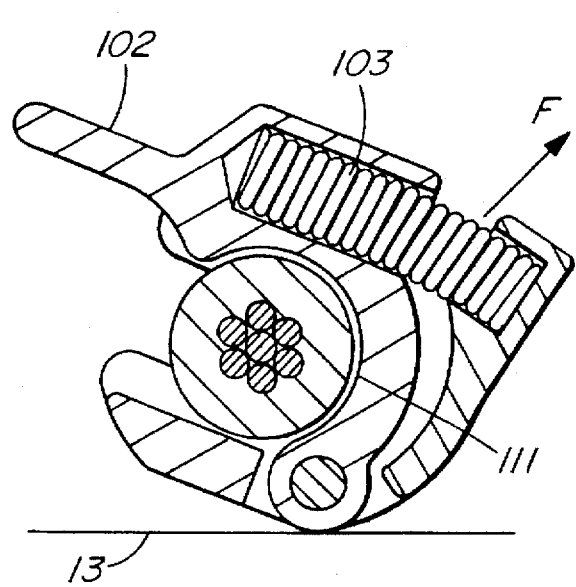
FIG. 4A is a cross-sectional view taken along IVA—IVA of FIG. 3 with the choker hook being illustrated in a position wherein the log is being transported from a felled area to the landing.
Figure 4B:
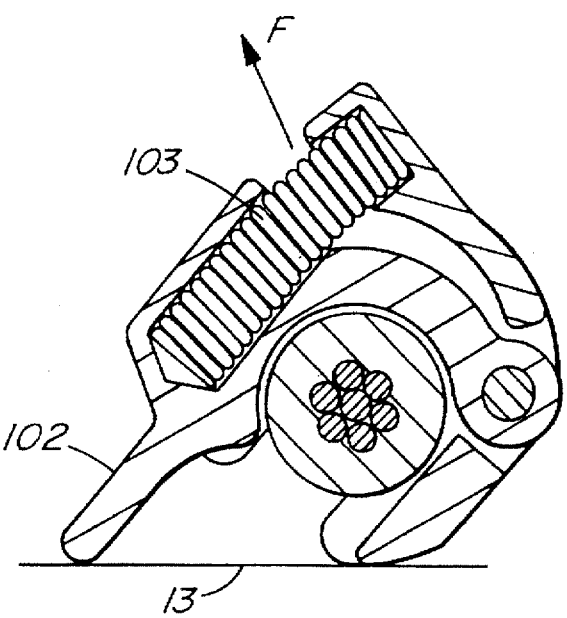
FIG. 4B is a cross-sectional view similar to FIG. 4A but illustrating the choker hook in a partially rotated position after the log has reached the landing and with the latch member in its initial contact with the outside of the log being transported.
Figure 4C:
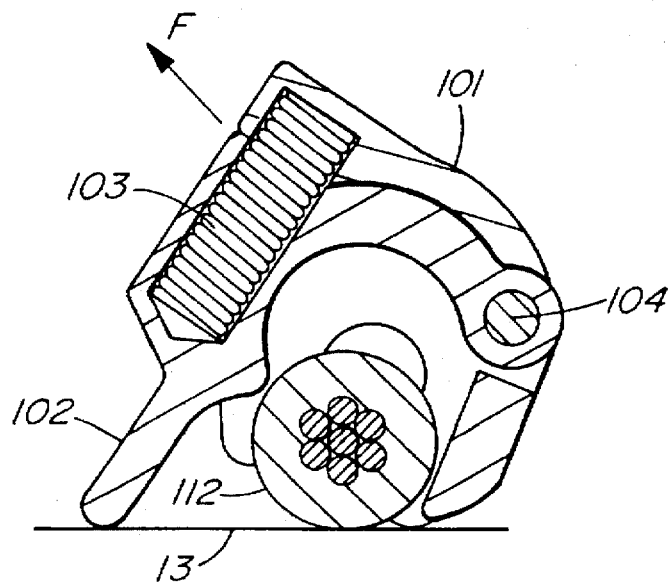
FIG. 4C is a cross-sectional view similar to FIGS. 4A and 4B but illustrating the latch member in its open position such that the ferrule of the choker cable is released from the ferrule pocket of the choker hook.

The release action, however, is precisely the same as the release action performed by the embodiment of FIGS. 1 and 2A–2C. As the log 13 is transported to the landing, the force "F" in cable 113 will be generally as illustrated in FIGS. 3 and 4A. When the log 13 is lowered in the landing, the operator will change the direction of pull "F" on the cable 113 such that the choker hook 100 is rotated into the position illustrated in FIG. 4B wherein the latch member 102 comes into contact with the surface of the log 13. As the direction of pull continues to change to that force "F" shown in FIG. 4C, the latch member 102 will rotate about axis 104 relative to main body 101 and against the bias provided by the compression springs 103. The ferrule 112 and cable 113 will be released from the ferrule pocket 111 of the choker hook 100.

Figure 5A:
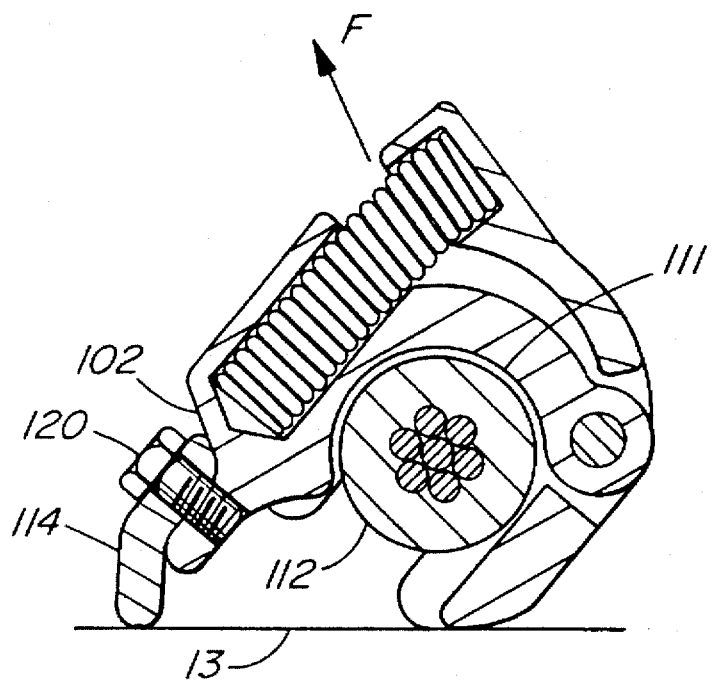
FIG. 5A is a cross-sectional view similar to FIGS. 4A–4C but illustrating the latch member contacting the outside of the log being transported through an additional bolt-on member.
Figure 5B:
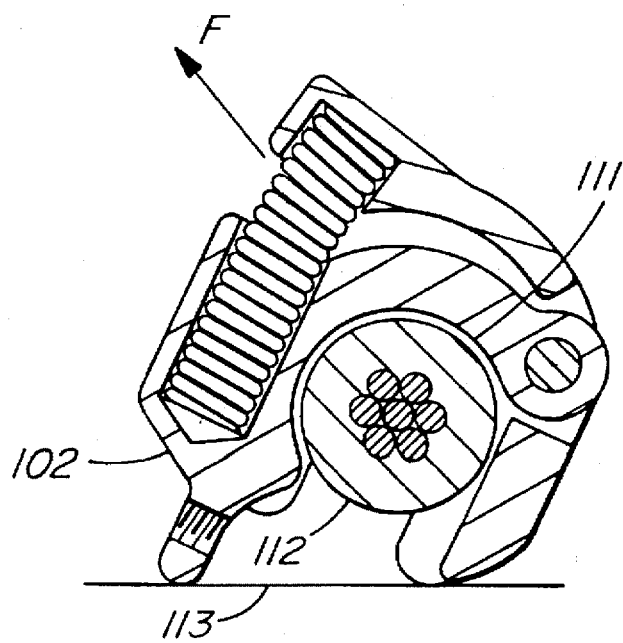
FIG. 5B is a cross-sectional view similar to FIG. 5A where the bolt-on member has been removed.

It is contemplated that the latch member 102 may have an adjustable outer extension 114 (FIG. 5A) which would be connected to the latch member 102 with bolts 120. This extension 114 may be made in different lengths or removed altogether (FIG. 5B). The extension 114 allows adjustment to the amount of rotation of the hook 100 before the extension 114 makes contact with the log 13. This, in turn, provides a control to the angle of inclination between force "F" and the surface of the log 13 required to actuate the latch 102 and release the ferrule 112 from the ferrule pocket 111. This control over the conditions for choker release will provide some compensation for the changing conditions of each cable system as they affect the relative inclination of the logs to the rigging. In addition, the use of the extension 114 facilitates replacement of the extension 114 in the event of wear and without dismantling the choker hook 100 in its entirety.

It is further contemplated that latch members 102 of different sizes could be used with the main body 101 depending upon the specific logging operation intended to be conducted. Thus, the ferrule pocket 111 could be opened generally at the time required for releasing transported logs for a variety of ground slope and topographical conditions and cable system configurations.

While compression springs 23, 103 have been illustrated as being used with the two embodiments described, it is contemplated that tension or torsion springs or an appropriate elastomer could also be readily adapted to fit the configuration of the choker hooks 10, 100. Other devices could also be used that provide a bias to the latch members 21, 102 relative to the main bodies 14, 101, respectively, so that the ferrule pockets 33, 111 tend to remain closed under operation until the choker hooks 10, 100 are rotated by the operator with the cable 11 such that the latch members 21, 102 contact the surface of log 13.

Yet a further embodiment of the invention is illustrated in FIGS. 6 and 7A–7C. In this embodiment, the configuration of the choker hook 200 more closely resembles the configuration of the prior art choker hook which does not utilise a release mechanism. This configuration has advantages in that the insertion of the ferrule 212 into the ferrule pocket 211 is accomplished in the same way as the insertion of the ferrule 212 into the ferrule pocket (not shown) of the prior art choker hook referred to above. That is, there exists an eye 205 into which the ferrule 212 formed on cable 213 is inserted. The cable 213 is rotated through approximately ninety (90) degrees and the ferrule 212 is pulled into its nested position within the ferrule pocket 211 without movement of the latch member 202. This is advantageous since kinks in the cable 213 close to the ferrule 212 are not uncommon. If the ferrule 212 needs to be pulled into the ferrule pocket 211 rather than simply rotated in accordance with the present embodiment, such setting of the ferrule in accordance with the previous embodiments of the invention can be difficult due to the cable kinks.

Figure 6:
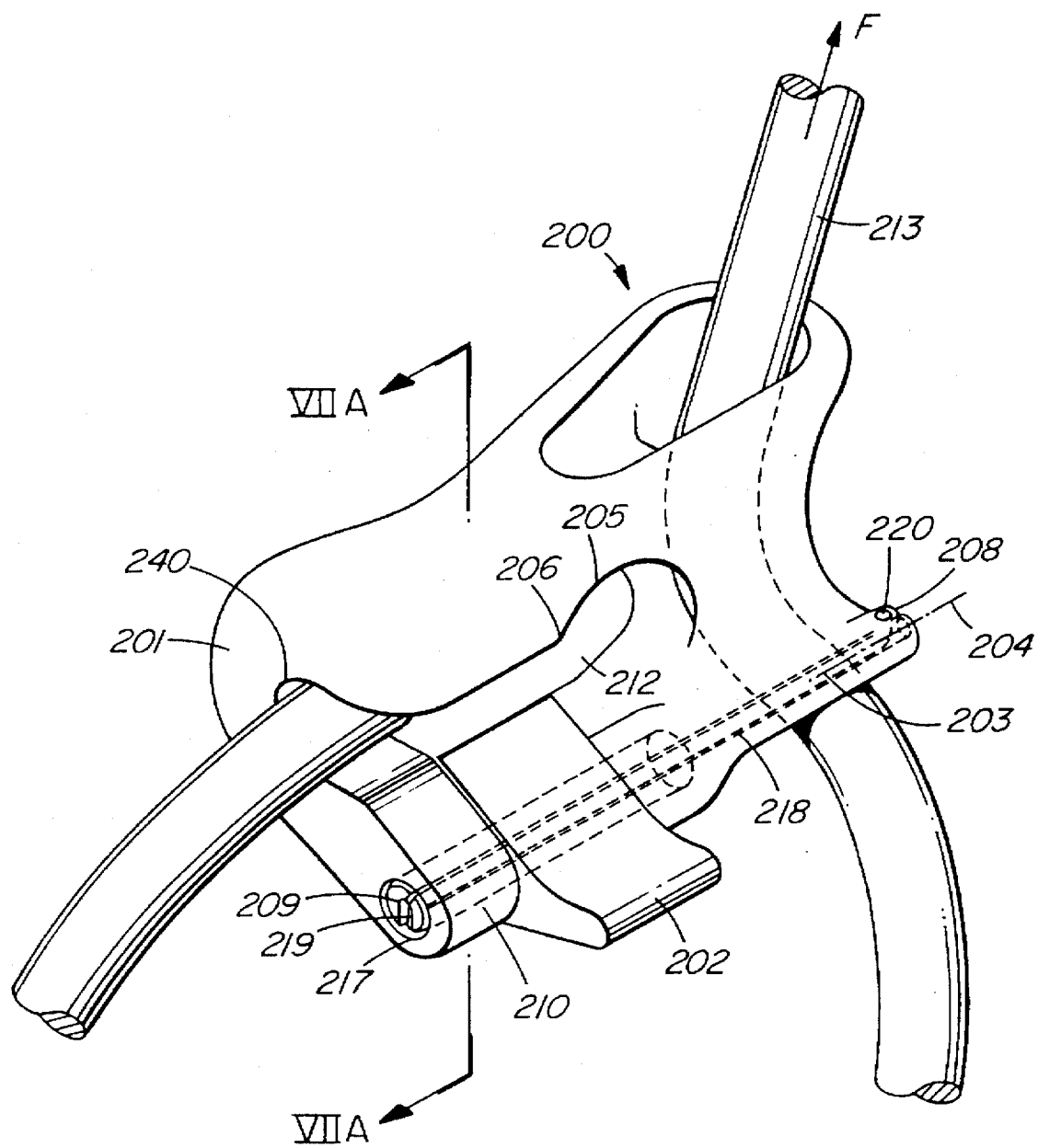
FIG. 6 is an isometric view of the choker hook according to a further embodiment of the invention.

A bore 217 is machined through the main body 201 and the latch member 202 and a pin 210 is inserted in the bore 217. A first slot 209 is machined into one end of the pin 210 and a second slot 208 is machined in the main body 201 as illustrated in FIG. 6. A roll pin 207 (FIGS. 7A–7C) is inserted through the latch member 202 as illustrated in order to remove any relative movement between the pin 210 and the latch member 202 such that when the latch member 202 rotates, the pin 210 will likewise rotate with the latch member 202.

A torsional spring wire 203 is inserted through a hole 218 machined into the main body 201 and pin 210. The spring wire 203 has a first bend 219 formed at one end which is adapted to fit into the slot 209 in pin 210 and a second bend 220 formed in the spring wire 203 which is adapted to fit into the slot 208 in main body 201. Thus, when latch member 202 and pin 210 rotate together because of the coupling effect created by roll pin 207, an increased torsional force in spring wire 203 will result tending to bias the latch member 202 to return to its normal operating position.

A predetermined initial torsional force in spring wire 203 is desired thereby to firmly keep latch member 202 in contact with a first stop 215 on main body 201 during the log transportation phase. This initial force is created by inserting spring wire 203 into pin 210 and hole 218 without the insertion of roll pin 207. After insertion of the spring wire 203, pin 210 is rotated by a screwdriver placed in slot 209 or otherwise counter-clockwise as viewed in FIG. 6. When the appropriate amount of initial torque is reached, roll pin 207 is inserted to maintain the pin 210 and spring wire 203 in such position relative to the latch member 202.

Figure 7A:
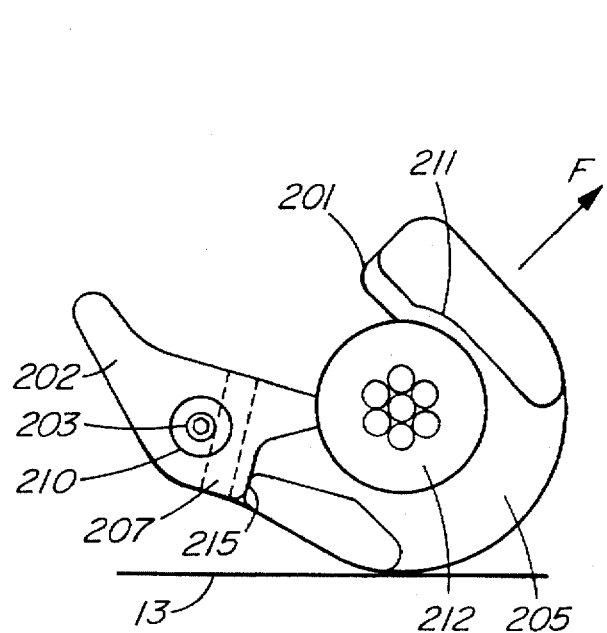
FIG. 7A is a cross-sectional view taken along VIIA—VIIA of FIG. 6 with the choker hook being illustrated in a configuration wherein the log is being transported from a felled area to the landing.

In operation, the ferrule 212 will be inserted through the eye 205 and the ferrule 212 and attached cable 213 will be rotated about ninety degrees such that the ferrule 212 takes the position illustrated in FIGS. 6 and 7A. The logs will then be transported from their felled position, the principal force from the transporting cable being illustrated as "F" in FIG. 7A.

Figure 7B:
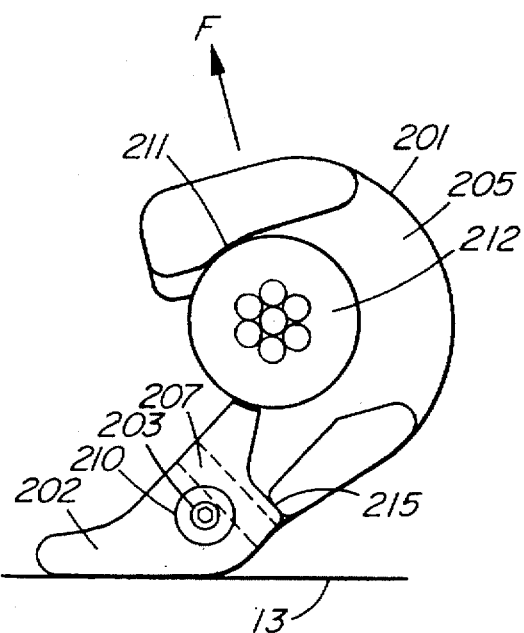
FIG. 7B is a cross-sectional view similar to FIG. 7A but illustrating the choker hook in a partially rotated position after the log has reached the landing and with the latch member in its initial contact with the outside of the log being transported.
Figure 7C:
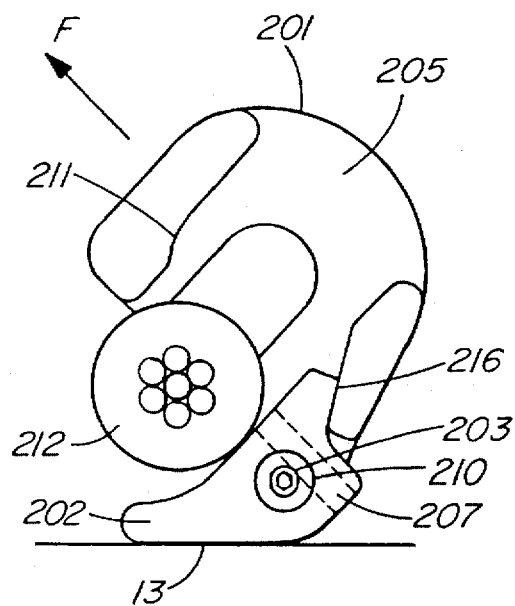
FIG. 7C is a cross-sectional view similar to FIGS. 7A and 7B but illustrating the latch member in its open position such that the ferrule of the choker cable is released from the ferrule pocket of the choker hook.

When the desired end position of the transported logs is reached, the direction of force "F" in the transporting cable is changed to that illustrated in FIG. 7B. This will bring the latch member 202 into contact with the surface of the log 13 and provide a force on the latch member 202 tending to rotate the latch member 202 and pin 210 in the direction indicated about axis 204 (FIG. 6) and against the torsion in spring wire 203. As the direction of force continues to change to that illustrated in FIG. 7C, the latch member 202 and pin 210 will rotate relative to the main body 201 of choker hook 200 until the latch member 202 contacts the second stop 216 on main body 201. In this position, the ferrule 212 will be release from the ferrule pocket 211 and the choker hook 200 can be returned to the felling area to transport further felled logs.

While a torsional spring wire 203 together with a pin 210 have been described with the FIG. 6 embodiment, different spring and pin configurations are readily envisioned that will maintain the latch member 202 in contact with the first stop 215 on the main body 201 and while will allow the latch member 202 to return to its normal configuration from contact between the latch member 202 and the second stop 216.

Many further embodiments of the invention will readily occur to those skilled in the art to which the invention relates and the specific embodiments described should be taken as illustrative of the invention only and not as limiting its scope as defined in accordance with the accompanying claims.

The embodiment of the invention in which an exclusive property or privilege is claimed are defined as follows:

1. A choker hook for use with a choker cable used for encircling and transporting a log and having a ferrule mounted on one end of said cable, said one end of said cable having a longitudinal axis, said choker hook comprising a main body, a latch member having an outer end and being rotatable relative to said main body between closed and open positions, a ferrule pocket formed between said main body and said latch member, said latch member being operable to maintain said ferrule in said ferrule pocket in said closed position by contact between said latch member and said ferrule, and said latch member being further operable to release said ferrule from said ferrule pocket in said open position, said latch member being movable about an axis generally parallel to said longitudinal axis of said one end of said cable when said ferrule is maintained in said ferrule pocket, said latch member moving from said closed to said open position when the outer end of said latch member is forced into contact with said log encircled by said choker cable.

2. A choker hook as in claim 1 and further comprising at least one spring operably mounted between said main body and said latch member to bias said latch member into a position wherein said ferrule pocket is in said closed position.

3. A choker hook as in claim 2 wherein said spring is a compression spring operably mounted between said main body and said latch member.

4. A choker hook as in claim 3 wherein at least one end of said compression spring is retained by a mount allowing a predetermined amount of oscillation of the end of said spring relative to one of said body or latch member.

5. A choker hook as in claim 3 wherein at least one end of said compression spring is retained by a pocket or recess formed in each of said body and latch member.

6. A choker hook as in claim 2 wherein said spring is a torsion spring acting to bias said latch member to a position wherein said ferrule pocket is closed.

7. A choker hook as in claim 2 and further comprising an extension detachably mounted to said latch member.

8. A choker hook as in claim 7 wherein said extension is adjustable relative to said latch member.

9. A choker hook as in claim 1 and further comprising a keeper on the internal surface of said latch member, said keeper being operable to retain said ferrule in said ferrule pocket when said latch member is in said closed position and to release said ferrule from said ferrule pocket when said latch member is in said open position.

10. A choker hook as in claim 9 and further comprising an opening in said main body to allow insertion of said cable.

11. A choker hook as in claim 10 wherein said keeper is positioned on the internal surface of said latch member such that the opening to said ferrule pocket remote from said opening in said main body is greater than the opening to said ferrule pocket closer to said opening thereby allowing insertion of said cable and ferrule to said pocket without substantial movement of said latch member.

12. A choker hook as in claim 10 wherein said opening in said main body has an internal surface operable to contact said ferrule when said ferrule is maintained in position within said ferrule pocket, said surface sloping downwardly toward the entry area of said opening and being generally flat, said surface being operable to assist the release of said ferrule from said ferrule pocket upon the rotation of said latch member from said closed to said open positions.

13. A choker hook as in claim 1 wherein said main body has first and second passageways extending therethrough, said first passageway having a diameter smaller than a ferrule mounted on the end of a cable and larger than the diameter of said cable so as to allow free movement of said cable within said first passageway, said second passageway being generally normal to said first passageway.

14. A choker hook as in claim 13 and further comprising first and second stops on said main body, said first stop contacting said latch member in said closed position and said second stop contacting said latch member in said open position.

15. A choker hook as in claim 14 wherein said latch member is biased into contact with said first stop by a spring.

16. A choker hook as in claim 15 wherein said spring is a torsional spring wire extending generally along the axis of rotation of said latch member and having one end maintained in position by said main body such that there is no relative movement between said one end and said main body.

17. A choker hook as in claim 16 and further comprising a pin between said main body and said latch member, said pin extending along the axis of rotation of said latch member and being held in stationary position relative to said latch member.

18. A choker hook as in claim 17 wherein said spring wire is inserted through said pin along said axis of rotation of said latch member, said pin being maintained stationary relative to said latch member.

19. A choker hook as in claim 18 wherein said pin is maintained stationary relative to said latch member with a retainer inserted into said latch member and contacting said pin.

20. A choker hook as in claim 19 wherein said retainer is a roll pin.

21. A choker hook for use with a choker cable used for encircling and transporting a log and having a ferrule on one end of the cable, said choker hook comprising a main body, a latch member having an outer end and being rotatable relative to said main body between closed and open positions, a ferrule pocket formed between said main body and said latch member, at least one spring operably mounted between said main body and said latch member to bias said latch member into a position wherein said latch member is in said closed position, said latch member being operable to hold said ferrule in said ferrule pocket in said closed position and to release said ferrule from said ferrule pocket in said open position, said latch member being movable from said closed to said open position when the outer end of said latch member is forced into contact with said log encircled by said choker cable.

* * * * *